(12) United States Patent
Shibuya et al.

(10) Patent No.: US 7,914,887 B2
(45) Date of Patent: Mar. 29, 2011

(54) THERMOPLASTIC RESIN FILM AND LABEL PAPER EMPLOYING THE SAME

(75) Inventors: Nobuhiro Shibuya, Ibaraki (JP); Ichiro Ohkawachi, Ibaraki (JP)

(73) Assignee: Yupo Corporation, Tokyo (JP)

( * ) Notice: Subject to any disclaimer, the term of this patent is extended or adjusted under 35 U.S.C. 154(b) by 333 days.

(21) Appl. No.: 10/379,734

(22) Filed: Mar. 6, 2003

(65) Prior Publication Data

US 2003/0157313 A1    Aug. 21, 2003

Related U.S. Application Data

(60) Division of application No. 09/816,377, filed on Mar. 26, 2001, now abandoned, and a continuation of application No. PCT/JP99/05161, filed on Sep. 21, 1999.

(30) Foreign Application Priority Data

Sep. 25, 1998  (JP) ................................. 1998-287373

(51) Int. Cl.
  *B32B 7/12*    (2006.01)
  *B32B 3/00*    (2006.01)
  *B32B 5/22*    (2006.01)

(52) U.S. Cl. ...................... 428/343; 428/354; 428/315.9; 428/317.9

(58) Field of Classification Search .................. 428/343, 428/354, 315.9, 317.9; 40/6, 665
See application file for complete search history.

(56) References Cited

U.S. PATENT DOCUMENTS

| 3,765,999 | A |   | 10/1973 | Toyoda |
|---|---|---|---|---|
| 3,773,608 | A | * | 11/1973 | Yoshimura et al. ........... 428/141 |
| 3,799,828 | A |   | 3/1974 | Takashi et al. |
| 4,341,880 | A |   | 7/1982 | Toyoda et al. |
| 4,705,719 | A |   | 11/1987 | Yamanaka et al. |
| 5,001,106 | A | * | 3/1991 | Egashira et al. ............. 503/227 |
| 5,318,817 | A | * | 6/1994 | Ohno et al. .................. 428/41.3 |
| 5,437,917 | A | * | 8/1995 | Ohe et al. .................... 428/211.1 |

FOREIGN PATENT DOCUMENTS

| EP | 0 436 044 A1 | 7/1991 |
|---|---|---|
| EP | 0 502 396 A1 | 9/1992 |
| EP | 0 587 178 A2 | 3/1994 |
| EP | 0 715 953 A2 | 6/1996 |
| EP | 0 745 638 A1 | 12/1996 |
| EP | 0 794 523 A2 | 9/1997 |
| EP | 0 845 490 A2 | 6/1998 |
| JP | 57-12642 | 1/1982 |
| JP | 57-56224 | 4/1982 |
| WO | WO 94/13476 | 6/1994 |

* cited by examiner

*Primary Examiner* — Victor S Chang
(74) *Attorney, Agent, or Firm* — Oblon, Spivak, McClelland, Maier & Neustadt, L.L.P.

(57) ABSTRACT

A thermoplastic resin film (i) which has a degree of dimensional change through heating and cooling (α) in the range of from −2% to 2% as measured by thermomechanical analysis in the range of from room temperature to 135° C., or which has a degree of thermal shrinkage of 1.8% or lower upon heating at 130° C. for 30 minutes or longer; and a label paper employing the same. The label paper has suitability for heated-roll fixing type electrophotographic printers and is satisfactory in curling after printing.

20 Claims, No Drawings

THERMOPLASTIC RESIN FILM AND LABEL PAPER EMPLOYING THE SAME

TECHNICAL FIELD

The present invention relates to a thermoplastic resin film which has a degree of dimensional change through heating and cooling (α) in the range of from −2% to 2% as measured by thermomechanical analysis in the range of from room temperature to 135° C., or which has reduced thermal shrinkage upon heating at 130° C. for 30 minutes or longer. The invention further relates to a label paper which employs the film and which has reduced curling after being printed with a printing method in which thermal energy is applied, in particular, printing with a heated-roll fixing type electrophotographic printer.

BACKGROUND ART

Thermoplastic resin films which have satisfactory water resistance, in particular, polyolefin-based synthetic papers, may be used, for example, as stickers for outdoor advertising or as labels which may be applied to containers for frozen foods, because the conventional stickers, and the coated paper used in such labels, have poor water resistance.

Resin films for use in water resistant labels are known. With respect to details thereof, reference may be made to, for example, such films are described in Examined Japanese Patent Publications Nos. 46-40794 and 49-1782, Unexamined Published Japanese Patent Applications Nos. 56-118437, 57-12642, and 57-56224, etc.

However, such polyolefin-based synthetic papers, when used as labels and printed with a heated-roll fixing type electrophotographic printer, in which the heated roll has a surface treatment as high as 140 to 190° C., have a higher degree of thermal shrinkage than the release paper adhered thereto, which causes the label to curling considerably after printing. In extreme cases, the label paper may roll up into a cylinder, making it difficult to peel the printed synthetic paper from the release paper. Because of this curling problem, polyolefin-based synthetic papers cannot be satisfactorily printed using a heated-roll fixing type electrophotographic printer.

An object of the present invention is to provide a thermoplastic resin film, and a label papers comprising such a film, which has reduced thermal curling compared with conventional papers, and can be easily peeled from the release paper when used as a label printed with a heated-roll fixing type electrophotographic printer.

DISCLOSURE OF THE INVENTION

The thermoplastic resin film (i) of the present invention may be used as a base paper for labels, and has a degree of dimensional change upon heating and cooling (α) in the range of from −2% to 2%, as measured by thermomechanical analysis in the range of from room temperature to 135° C., or which has a degree of thermal shrinkage of 1.8% or lower upon heating at 130° C. for 30 minutes or longer. A label prepared from this film comprises a label paper comprising the thermoplastic resin film of the present invention, a pressure-sensitive adhesive, and a release paper. The label of the present invention has reduced curl height after printing with a heated-roll fixing type electrophotographic printer, and is therefore suitable for use with this printing method.

The invention directed attention to the relationship between the thermal dimension change of label papers and the curling thereof in order to solve the problems described above, and the above object is accomplished by regulating the thermal dimensional change of label papers comprised of the thermoplastic resin film of the present invention, to a specific value. Namely, a reduction in curl height and satisfactory printing properties have been achieved by using a thermoplastic resin film as a label paper which has a degree of dimensional change (α) in a specific range, and/or a specific degree of thermal shrinkage.

BEST MODE FOR CARRYING OUT THE INVENTION

The thermoplastic resin film (i) of the present invention has a reduced degree of dimensional change upon heating and cooling (α) as measured by thermomechanical analysis in the range of from room temperature to 135° C., and/or a reduced degree of thermal shrinkage upon heating at 130° C. for 30 minutes or longer. The present invention further relates to a label paper comprising the film and, bonded thereto, a pressure-sensitive adhesive layer (ii) and a release paper (iii). The present invention will be explained below in detail.

(1) Thermoplastic Resin Film (i)

The thermoplastic resin used in the thermoplastic resin film (i) of the present invention may include, for example, polyolefin resins such as ethylene-based resins, e.g., high-density polyethylene and medium-density polyethylene, and propylene-based resins, poly(4-methyl-1-pentene), ethylene/cycloolefin copolymers, polyamide resins such as nylon-6, nylon-6,6, nylon-6,10, nylon-6,12, and nylon-6,T, thermoplastic polyester resins such as poly(ethylene terephthalate) and copolymers thereof, poly(ethylene naphthalate), and aliphatic polyesters, and thermoplastic resins such as polycarbonates, atactic polystyrene, syndiotactic polystyrene, and poly(phenylene sulfide). These resins may be used as a mixture of two or more thereof. Polyolefin resins are the preferred resin. Propylene-based resins are the preferred polyolefin resin, based, for example, on their good chemical resistance, and low cost.

The propylene-based resin may include an isotactic or syndiotactic propylene homopolymer or a propylene homopolymer having any of various degrees of stereoregularity, or a copolymer having propylene as the main component, with one or more α-olefin comonomers such as ethylene, butene-1, hexene-1, heptene-1, and 4-methyl-1-pentene. This copolymer may be a binary system, ternary system, or quaternary system, and may be a random copolymer or block copolymer.

The thermoplastic resin may also be blended with fine inorganic particles to form the thermoplastic resin film (i). The fine inorganic particles may include, for example, particles of calcium carbonate, calcined clay, silica, diatomaceous earth, talc, titanium oxide, barium sulfate, alumina, or the like, which have an average particle diameter of from 0.01 to 15 μm.

If the thermoplastic resin film is a polyolefin resin film, the polyolefin may be blended with fine organic particles. The fine organic particles may have a melting point of from 170 to 300° C. higher than the melting point of the polyolefin resin, or a glass transition temperature of from 170° C. to 280° C. higher than the melting point of the polyolefin resin.

For example, the fine organic particles may include particles of poly(ethylene terephthalate), poly(butylene terephthalate), a polycarbonate, nylon-6, nylon-6,6, nylon-6,T, a polymer of a cycloolefin, or the like.

Fine inorganic particles are preferred to organic fine particles because of their lower cost. Calcium carbonate, calcined clay, and talc are especially preferred inorganic fine particles.

As needed, the thermoplastic resin film may also include a stabilizer, light stabilizer, dispersant, lubricant, and the like. The amount of stabilizer incorporated into the thermoplastic resin film may be from 0.001 to 1% by weight, based on the total weight of the thermoplastic resin. The stabilizer may include, for example, a sterically hindered phenol, phosphorus, or amine compound or the like. The amount of light stabilizer incorporated into the thermoplastic resin film may be from 0.001 to 1% by weight, based on the total weight of the thermoplastic resin. The light stabilizer may include, for example, a sterically hindered amine, benzotriazole, or benzophenone compound or the like. In addition, a dispersant for the fine inorganic particles may also be added, including for example a silane coupling agent, a higher fatty acid such as oleic acid or stearic acid, a metal soap, poly(acrylic acid), poly(methacrylic acid), salts thereof, or the like. The amount of dispersant may be from 0.01 to 4% by weight, based on the total weight of the thermoplastic resin.

The thermoplastic resin film (i) may have one or more layers. For example, the thermoplastic resin film (i) may be a single layer film, or may have a two-layer structure composed of a base layer and a surface layer, a three-layer structure having a surface layer on each of the front and back sides of a base layer, or a multilayer structure comprising a base layer, a surface layer, and one or more other resin film layers interposed therebetween. The film may comprises from 35 to 100% by weight thermoplastic resin and from 65 to 0% by weight inorganic and/or organic fine particles.

If the thermoplastic resin film (i) is a single-layer polyolefin resin film and contains inorganic and/or organic fine particles, it may comprise from 35 to 99.5% by weight of a polyolefin resin and from 65 to 0.5% by weight of the inorganic and/or organic fine particles, and preferably comprises from 50 to 97% by weight polyolefin resin and from 50 to 3% by weight of the inorganic and/or organic fine particles. If the thermoplastic resin film has a multilayer structure comprising a base layer and a surface layer each containing inorganic and/or organic fine particles, the base layer of the thermoplastic resin film may comprise from 35 to 99.5% by weight of a polyolefin resin and from 65 to 0.5% by weight of the inorganic and/or organic fine particles, and the surface layer may comprise from 25 to 100% by weight of a polyolefin resin and from 75 to 0% by weight of the inorganic and/or organic fine particles. In this case, the base layer preferably comprises from 50 to 97% by weight of a polyolefin resin and from 50 to 3% by weight of the inorganic and/or organic fine particles and the surface layer preferably comprises from 30 to 97% by weight of a polyolefin resin and from 70 to 3% by weight of the inorganic and/or organic fine particles.

In order to improve the flexibility of the film, the amount of the inorganic and/or organic fine particles incorporated into the base layer in a single-layer film or a multilayer film structure is preferably 65% by weight or smaller. If the film is to be made by a process which includes stretching the film, described below, the amount of the inorganic and/or organic fine particles in the surface layer is preferably 75% by weight or less, in order that the stretched film have a higher level of surface strength.

Formation of the Resin Film:

The method of making the thermoplastic resin film (i) of the present invention is not particularly limited, and any of various known techniques may be used. For example, the thermoplastic resin film may be made by extruding a molten resin into a sheet form with a single-layer or multilayered T-die or I-die, connected to a screw type extruder, or by calendering, rolling, inflation, by casting or calendering a mixture of a thermoplastic resin and an organic solvent or oil and subsequent removing the solvent or oil, casting a solution of a thermoplastic resin and removing the solvent, and the like. In order to efficiently obtain a film having a large area, a combination of any of the above film forming methods with the stretching treatment described below, is preferred.

Stretching:

Various known methods may be used for stretching, and may be carried out in a temperature range known to be suitable for the thermoplastic resin used. If the resin is a noncrystalline resin, the stretching temperature is not lower than the glass transition point of the thermoplastic resin. If the resin is crystalline, the stretching temperature range may be from the glass transition point of the noncrystalline portions of the resin to the melting point of the crystalline portions. Examples of methods for stretching films include, for example, machine-direction stretching utilizing a difference in peripheral speed between rolls, transverse-direction stretching with a tenter oven, calendering, simultaneous biaxial stretching with a combination of a tenter oven and a linear motor, and the like.

The stretch ratio is defined as the area of the film after stretching, divided by the area of the film prior to stretching. The stretch ratio is not limited to any particular value, and is selected based on the desired properties of the thermoplastic resin. For example, if the thermoplastic resin is polypropylene or a copolymer thereof, the unidirectional-stretch ratio may be from about 1.2 to about 12, preferably from 2 to 10, and the biaxial stretch ratio may be from about 1.5 to about 60, preferably from 10 to 50. If other thermoplastic resins are used, the unidirectional stretch ratio may be from 1.2 to 10, preferably from 2 to 5, and that in biaxial stretch ratio is from 1.5 to 20, preferably from 4 to 12. If desired, the film may also be heat treated at a high temperature.

The stretching temperature is lower than the melting point of the thermoplastic resin by from 2 to 150° C., preferably from 2 to 60° C., and is selected based on the stretching process used. For example, if the thermoplastic resin is a propylene homopolymer or copolymer (melting point, 155 to 167° C.), high-density polyethylene (melting point, 121 to 134° C.), or poly(ethylene terephthalate) (melting point, 246 to 252° C.), the stretching temperature may be in the range of from 110 to 164° C., from 110 to 120° C., or from 104 to 115° C., respectively.

Furthermore, the stretching speed may be from 20 to 350 m/min.

If the thermoplastic resin film is made from a polypropylene homopolymer using a process comprising a transverse-direction stretching step using a tenter oven, an effective technique for reducing the degree of thermal shrinkage is to dispose a heat-setting zone in the latter half of the process and heat the stretched and formed polypropylene film to a temperature which is at most close to its melting temperature. The temperature of the heat-setting zone can any of a wide range of temperatures, which depends on the line, speed of the film during the stretching step, the flow speed and flow rate of the high-temperature air blown in the heat-setting zone, the structure of the heat-setting zone, etc. For example, the temperature of the heat setting zone may be in the range of from 158 to 175° C.

If the thermoplastic resin film contains fine inorganic particles or an organic filler, the film surfaces may also develop microcracks, and inner portions of the film may develop microvoids.

After the stretching, the thermoplastic resin film may have a thickness in the range of from 30 to 350 µm, preferably from 50 to 300 µm.

Heat Treatment:

Usually, a combination of the forming and stretching process described above, together with high-temperature setting in a heat-setting zone or a heat treatment after the forming, provides a means for regulating the thermoplastic resin film (i) of the invention so that the degree of dimensional change through heating and cooling ($\alpha$) of the film, as measured by thermomechanical analysis in the range of from room temperature to 135° C., is from −2% to 2%, preferably from −1.5% to 1.5%, more preferably from −1.2% to 1.2%, and/or the degree of thermal shrinkage of the film upon heating at 130° C. for 30 minutes is 1.8% or lower, preferably 1.5% or lower, more preferably 1.2% or lower.

The heating temperature of the heating zone or the heat treatment is preferably lower than the melting point of the thermoplastic resin, and may be, for example, in the range of from 90° C. to 250° C., preferably from 95° C. to 250° C., more preferably from 105° C. to 160° C. At temperatures lower than 90° C., the heat treatment tends to have an insufficient effect on the degree of dimensional change or thermal shrinkage. At temperatures exceeding 250° C., the film may deform or becomes wavy. Furthermore, if the thermoplastic resin is a polypropylene resin, the heating temperature is preferably in the range of from 90 to 175° C., more preferably from 95 to 158° C., even more preferably from 105 to 140° C. At temperatures lower than 90° C., either the effect of the heat treatment is insufficient, or a long heating time is necessary in order to obtain a sufficient effect, thereby making it difficult to efficiently produce the film on an industrial scale. The temperature of a heat conducting medium used for the heating the film is selected so that the film has a temperature within the range shown above.

The heating time may be selected over a wide range of times, preferably not shorter than 0.1 second. However, it may be in the range of from 2 seconds to 30 days, more preferably from 4 seconds to 7 days, even more preferably from 4 seconds to 2 days. Heating times longer than 30 days are apt to result in film deterioration, while heating times shorter than 0.1 second may provide insufficient treatment. The heat treatment may be carried out after the film itself is formed, or after the film is surface treated, discussed below.

Examples of methods for heat treating the film of the present invention include a heat treatment conducted in a high-temperature heat-setting zone after stretching the film in a tenter oven, as described above, a heat treating the film in sheet or roll form in an oven, heating with high-temperature air, steam, or other heating conducting media, etc. The heat treatment may be carried out in such a manner that the ends of the film are kept unconstrained so as to allow the film to gradually shrink upon heating. If the ends of the film are fixed, the heat treatment may be conducted by arranging the devices used to fixing two opposed ends or for fixing the two pairs of opposed ends, so that the distance therebetween may be reduced in conjunction with the thermal shrinkage of the film. Alternatively, the treatment may be conducted in such a manner that at least two opposed ends of the film are kept fixed so as not to follow the film shrinkage. Specific examples include a method in which the film in a roll form is heated in a forced-air oven, a method in which the film in the form of either single sheet or in the form of stacked sheets is heated, a method in which the film is heated by contact with at least one high-temperature roll, etc.

Surface Treatment:

The thermoplastic resin film (i) is preferably subjected to a surface treatment on at least the side of the film which is intended to be printed, or on both sides, for the purpose of improving toner adhesion, improving the adhesion of a toner-receiving layer on the thermoplastic resin film (i), or imparting antistatic properties.

Such surface treatments may include, for example, a surface oxidation treatment, a combination of a surface oxidation treatment and a coating of a surface-treating agent, etc. Conventional treatments for films, either alone or in combination, such as corona discharge treatment, flame treatment, plasma treatment, glow discharge treatment, and ozone treatment may be used as the surface oxidation treatment. Corona treatment and flame treatment are preferred. If corona treatment is used, the amount of treatment should be from 600 to 12,000 J/m$^2$ (from 10 to 200 W-min/m$^2$), preferably from 1,200 to 9,000 J/m$^2$ (from 20 to 180 W-min/m$^2$), and if flame treatment is used, the amount of treatment should be from 8,000 to 200,000 J/m$^2$, preferably from 20,000 to 100,000 J/m$^2$.

A surface-treating agent may consists mainly of one ingredient or a mixture of two or more ingredients selected from the following primers and antistatic polymers. In order to obtain good toner adhesion and antistatic properties, the preferred surface-treating agents are primers and combinations of one or more primers with one or more antistatic polymers.

(1) Primers

The primer may be, for example, polyethyleneimine type polymers such as polyethyleneimine, polyethyleneimines modified with an alkyl group having 1 to 12 carbon atoms, poly(ethyleneimine-urea) ethyleneimine ad ducts of polyamine-polyamides, and epichlorohydrin adducts of polyamine-polyamides, acrylic ester polymers such as acrylamide/acrylic ester copolymers, acrylamide/acrylic ester/methacrylic ester copolymers, polyacrylamide derivatives, acrylic ester polymers containing oxazoline groups, and poly(acrylic esters), water-soluble resins such as polyvinylpyrrolidone, polyethylene glycol, poly(vinyl alcohol); water-dispersible resins such as poly(vinyl acetate), polyurethanes, ethylene/vinyl acetate copolymers, poly(vinylidene chloride), chlorinated polypropylene, and acrylonitrile/butadiene copolymers, and the like.

Polyethyleneimine type polymers, urethane resins, poly (acrylic esters), and the like are preferred primers. Polyethyleneimine type polymers are more preferred, and polyethyleneimine having a degree of polymerization of from 20 to 3,000, ethyleneimine adducts of polyamine-polyamides, and modified polyethyleneimines obtained by modifying these polymers with halogenoalkyl, halogenoalkenyl, halogenocycloalkyl, or halogenobenzyl groups having 1 to 24 carbon atoms, are most preferred.

(2) Antistatic Polymers

Examples of antistatic polymers include cationic, anionic, amphoteric, and other polymers. Examples of cationic polymers include polymers having a quaternary ammonium salt structure or a phosphonium salt structure, nitrogen-containing acrylic polymers, and acrylic or methacrylic polymers having nitrogen as a quaternary ammonium salt structure. Examples of the amphoteric polymers include nitrogen-containing acrylic or methacrylic polymers having a betaine structure. Examples of the anionic polymers include styrene/ maleic anhydride copolymers or alkali metal salts thereof, alkali metal salts of ethylene/acrylic acid copolymers, alkali metal salts of ethylene/methacrylic acid copolymers, and the like. Acrylic or methacrylic polymers having nitrogen as a quaternary ammonium salt structure are especially preferred.

An antistatic polymer having any desired molecular weight may be obtained by regulating the polymerization conditions under which it is made, for example, the polymerization temperature, the kind and amount of a polymerization initiator, the amount of a solvent used, and the presence of a chain transfer agent. In general, the antistatic polymer should have a molecular weight ($M_w$) of from 1,000 to 1,000,000 preferably 1,000 to 500,000.

The surface-treating agent described above for use in the present invention may contain the following optional ingredients, as needed.

(3) Optional Ingredient 1: Crosslinking Agent

Coating film strength and water resistance can be further improved by adding a crosslinking agent. Examples of the crosslinking agent may include, for example, epoxy compounds such as a glycidyl ether and a glycidyl ester, and aqueous dispersion type resins such as epoxy resins and isocyanate, oxazoline, formalin, and hydrazide compounds. The amount of the crosslinking agent added to the surface-treating agent may be in the range of up to 100 parts by weight per 100 parts by weight of the effective ingredients of the surface-treating agent, which exclude the solvent.

(4) Optional Ingredient 2: Alkali Metal Salt or Alkaline Earth Metal Salt

Examples of the alkali metal salt or alkaline earth metal salt may include water-soluble inorganic salts such as, e.g., sodium carbonate, sodium hydrogen carbonate, potassium carbonate, sodium sulfite, and other alkaline salts, and further may include sodium chloride, sodium sulfate, sodium nitrate, sodium tripolyphosphate, sodium pyrophosphate, and ammonium alum.

The amount of optional ingredient 2 may be 50 parts by weight or smaller per 100 parts by weight of the effective ingredients of the surface-treating agent, which exclude the solvent.

(5) Optional Ingredients 3:

The surface-treating agent may further contain a surfactant, an antifoamer, a water-soluble or water-dispersible, finely particulate substance, and other processing aids.

The amount of optional ingredients 3 may be 20 parts by weight or smaller per 100 parts by weight of the effective ingredients of the surface-treating agent, which exclude the solvent.

Formation of Surface Treatment Layer:

The ingredients for the surface treatment layer described above are typically as a solution, for example by dissolving them in water or a hydrophilic solvent such as methyl, alcohol, ethyl alcohol, or isopropyl alcohol. Preferably, the ingredients are used in the form of an aqueous solution. The total concentration of these ingredients in the solution is, for example, about from 0.1 to 20% by weight, preferably about from 0.1 to 10% by weight, based on the total weight of the solution.

The surface treatment layer is coated onto the thermoplastic resin film (i) by coating the solution with a roll coater, blade coater, bar coater, air-knife coater, size press coater, gravure coater, reverse coater, die coater, lip coater, spray coater, or the like. Smoothing of the surface treatment layer is carried out as needed, and any excess water or hydrophilic solvent is removed by a drying step.

The solution may be applied in an amount of from 0.005 to 5 g/m², preferably from 0.01 to 2 g/m², based on the weight of the dried film.

If the thermoplastic resin film (i) is a stretched film, the surface treatment layer may be provided by a single-stage coating or multistage coating process, either before or after the machine- or transverse-direction stretching.

Properties of Thermoplastic Resin Film (i):

If the thermoplastic resin film has been stretched, the thermoplastic resin film has a porosity, as shown by the following equation, of from 5 to 60%, preferably from 8 to 35%, more preferably from 8 to 30%. If the porosity of the film is lower than 5%, it is difficult to reduce the weight of the film. Porosities exceeding 60% are apt to result in poor label strength.

$$\text{Porosity}(\%) = \frac{\rho_0 - \rho}{\rho_0} \times 100$$

$\rho_o$: density of the resin film before stretching
$\rho$: density of the resin film after stretching The density of the film as measured in accordance with JIS-P81118-1976, and may be in the range of from 0.65 to 1.3 g/cm³, preferably from 0.8 to 1.1 g/cm³. Films with densities lower than 0.65 g/cm³ tend to have poor base strength. If the density of the film exceeds 1.3 g/cm³, a stack of many sheets may be too heavy to carry.

Furthermore, the film should have the following properties: the opacity as measured in accordance with JIS-P8138-1976 should be from 20 to 100%, preferably from 60 to 100, and the Bekk's surface smoothness should be from 50 to 25,000 seconds.

Thermomechanical Analysis:

The degree of dimensional change after heating and cooling ($\alpha$) as measured by thermomechanical analysis (hereinafter abbreviated as "TMA") in the range of from room temperature to 135° C. (hereinafter abbreviated as "degree of dimensional change ($\alpha$)") of the thermoplastic resin film (i) of the present invention should be in the range of from −2 to 2%.

The thermomechanical analysis of the films of the present invention may be conducted with a commercial thermomechanical analyzer. Typical examples of the apparatus, principle, features, and uses are described in documents including "1997 Bunseki Kiki Soran", edited and published by Japan Analytical Instruments Association, Chap. IV, p. 92 (Sep. 1, 1997) and Bernhard Wunderlich, "Thermal Analysis", Chap. 6, pp. 311-332, Academic Press, Inc., 1990, herewith incorporated by reference.

Specific examples of the TMA apparatus include a "TMA120C" manufactured by Seiko Instruments Inc., a "TMA7" manufactured by Perkin-Elmer Corp., a "TMA-50" manufactured by Shimadzu Corp., a "TM-9200" manufactured by Shinku Riko, and the like.

An example of a method for measuring the degree of dimensional change after heating and cooling by TMA of a film according to the present invention is as follows. A TMA apparatus, e.g., "TMA120C" manufactured by Seiko Instruments Inc., was used in the tension mode. A fixed load selected in the range of from about 1 to 20 g was used. A film sample having a width of 4 mm and a length of 10 mm (excluding the portions fixed to the upper and lower clamps of the TMA) was prepared and affixed to the TMA. The rate of heating and that of cooling during each measurement was 2° C./min. The samples were heated in a measuring temperature range, i.e., from room temperature, e.g., 25° C. to 50° C., to a set temperature of 150° C. (actual temperature, 135° C.) and then cooled back to room temperature. The degree of shrinkage or expansion of the sample piece is expressed as a percent of the initial sample length of 10 mm, and is referred to as the degree of dimensional change.

The degree of dimensional change (α) of the thermoplastic resin film (i) of the present invention means the larger of the degrees of machine-direction (MD) and transverse-direction (TD) dimensional changes after heating and cooling (α) as measured by thermomechanical analysis in the range of from room temperature to 135° C. The degree of dimensional change may be in the range of from −2% (elongation) to 2% (shrinkage), preferably from −1.5% (elongation) to 1.5% (shrinkage), more preferably from −1.25% (elongation) to 1.25% (shrinkage), even more preferably from −1% (elongation) to 1% (shrinkage). If the degree of dimensional change of the film is outside the range of −2% to 2%, the label paper curls considerably when printed on a heated-roll fixing type electrophotographic printer, which is likely to result in printing trouble or leads to poor efficiency in peeling the label from the release paper.

Degree of Thermal Shrinkage:

The degree of thermal shrinkage after heating at 130° C. for 30 minutes of the thermoplastic resin film (i) of the present invention is the average of the machine-direction and transverse-direction thermal shrinkage values. The degree of thermal shrinkage may be 1.8% or lower, preferably 1.5% or lower, more preferably 1.2% or lower. If the degree of thermal shrinkage of the film exceeds 1.8%, the label curls considerably when printed on a heated-roll fixing type electrophotographic printer.

The degree of thermal shrinkage may be determined by cutting the film into a square shape of a given size, e.g., 100 mm in both length and width, measuring the dimensions of the square sample after holding it in a thermo-hygrostatic chamber having a temperature of 23° C. and a relative humidity of 50%, subsequently heat treating the sample in a 130° C. forced-air oven for 30 minutes, taking the film out of the forced-air oven, allowing the film to cool in the same thermo-hygrostatic chamber for 1 hour, and then measuring the dimensions of the sample.

Formation of Toner-Receiving Layer:

In order to improve the reception of a toner on the film after printing, a toner-receiving layer comprising an inorganic and/or organic pigment and a binder may be formed on the side of the thermoplastic resin film (i) which is to be printed. Any conventional inorganic pigment may be used, such as light-weight or heavy calcium carbonate, clay, titanium oxide, silica, alumina, or the like. In order to improve the toner reception properties of the film, the thickness of the toner reception layer may be from 0.1 to 20 μm, preferably in the range of from 0.5 to 15 μm. The binder may be a polymeric binder such as an acrylic, styrene, or acrylic/styrene polymer, natural rubber, a synthetic rubber, an ethylene/acrylic or ethylene/methacrylic polymer, or a urethane polymer. The binder may have the form of particles dispersed in water, such as a dispersion or emulsion.

The toner-receiving layer may be coated on the surface of the thermoplastic resin film (1), for example using a roll coater, blade coater, bar coater, air-knife coater, gravure coater, reverse coater, die coater, lip coater, spray coater, or the like. The toner-receiving layer may also be smoothed, as needed. The toner-receiving layer may also be dried after coating.

Pressure-Sensitive Adhesive Layer (ii):

The type, thickness, and amount of pressure-sensitive adhesive layer (ii) formed on one side of the thermoplastic resin film (i) may be selected based on the type of adhesive used, the environment in which the label paper is expected to be used, the adhesive strength desired, etc.

A general purpose water- or solvent-based pressure-sensitive adhesive may be applied and dried to form a pressure-sensitive adhesive layer. Any pressure-sensitive adhesive, for example those based on natural rubber, a synthetic rubber, an acrylic- or the like, may be used. Pressure-sensitive adhesives based on a synthetic polymer may be used in the form of a solution in an organic solvent, or in the form of particles dispersed in water, such as a dispersion or emulsion.

A pressure-sensitive adhesive containing a pigment such as titanium white can be used in order to improve the opacity of the label.

Formation of Pressure-Sensitive Adhesive Layer (ii):

The pressure-sensitive adhesive layer (ii) may be formed by applying a solution of a pressure-sensitive adhesive on the silicone-treated side of a release paper (iii). The coating may be carried out with a roll coater, blade coater, bar coater, air-knife coater, gravure coater, reverse coater, die coater, lip coater, spray coater, or the like. The pressure-sensitive adhesive layer (ii) may also be smoothed if needed, and be dried after coating.

The pressure-sensitive adhesive layer (ii) may also be coated directly on the thermoplastic resin film (i).

Although the pressure-sensitive adhesive layer (ii) may have any suitable thickness, depending on the intended use of the label, it is usually in the range of from 2 to 30 μm, preferably from 5 to 20 μm.

Release Paper (iii):

The release paper (iii) contacts the pressure-sensitive adhesive layer formed on the thermoplastic resin layer (i), and is generally treated, on the side in contact with the pressure-sensitive adhesive layer (ii), with a silicone in order that the release paper may be readily removed from the pressure-sensitive adhesive layer (ii).

Any conventional release paper may be used as release paper (iii). For example, the release paper may be silicone-treating wood-free or kraft paper which has not been pre-treated or calendered. In addition, resin coated, film laminated, or silicone-treated glassine paper, coated paper, plastic film, or the like, may be used. Paper or film laminated on both sides with a polymer is effective in reducing curling, because it is less influenced by ambient humidity.

The degree of dimensional change (β) of a release paper may be measured under the same conditions as the degree of dimensional change of the thermoplastic resin film (i) of the present invention, as determined by TMA. The degree of dimensional change (β) of a release paper means the degree of dimensional change in the machine direction, i.e., the direction (MD) in which the release paper has been wound into a roll.

Difference in Degree of Dimensional Chance between Thermoplastic Resin Film (i) and Release Paper:

In order to further reduce curling caused by printing on a printer, the difference (α-β) between the degree of dimensional change (α) of the thermoplastic resin film (i) of the present invention, and the degree of dimensional change (β) of the release paper as measured under the same conditions, may be in the range of from −1.5% to 1.5%, preferably from −1.2% to 1.2%, more preferably from −0.5% to 1%, even more preferably from 0% to 0.8%.

Curling:

The label paper of the present invention is suitable for printing using a heated-roll fixing type electrophotographic printer. In order to provide improved the ease of stripping the printed film from the release paper, printed A4 label paper (210 mm×297 mm) should have an average curl height at the four corners of 50 mm or smaller, preferably 45 mm or smaller, as measured 2 minutes after the printing.

Printing:

The thermoplastic resin film (i) of the present invention may be used for any printing method in which heat energy is applied to the printed surface, such as, e.g., thermal transfer, sublimation transfer, and heat-sensitive printing, and in letterpress printing, gravure printing, flexography, solvent-based offset printing, and ultraviolet-curable offset printing, as well as the base film of a label printed using a heated-roll fixing type electrophotographic printing process. The thermoplastic resin film (i) or a label paper comprising such a film may be used in the form of a sheet, or in the form of a roll when printing with a rotary press. Furthermore, a laminate of the thermoplastic resin film (i) with a release paper may be form printed and then printed on an electrophotographic printer.

The present invention will be explained in more detail by means of the following Examples.

The raw materials and evaluation methods used in the Examples are as follows. The term "parts" in an ingredient blending ratio means "parts by weight".

Example 1

Thermoplastic Resin Film (i)

A composition (C) was prepared by compounding polypropylene having a melt flow rate (MFR) of 4 g/10 mm with 15 wt % heavy calcium carbonate having an average particle diameter of 1.3 μm. 0.7 wt % titanium white, and 5.5 wt % high-density polyethylene having an MFR of 11 g/10 min and was kneaded in an extruder set at 250° C., subsequently extruded into a sheet form through a T-die connected to an extruder set at 230° C., and cooled with a cooler to obtain an unstretched sheet.

Into the above-described composition, and into the resin compositions described in the following Examples and Comparative Examples, phenolic stabilizers, i.e., 0.05 parts of 3-methyl-2,6-di-t-butylphenol and 0.08 parts of Irganox 1010 (trade name; manufactured by Ciba-Geigy Corp.), and 0.05 parts of Weston 618 (trade name; manufactured by G.E. Plastics), a phosphorus compound stabilizer, per 100 parts of the sum of the polypropylene and calcium carbonate used, were also incorporated. These same stabilizers were also used in the compositions of Examples 2 to 4.

This unstretched sheet was then heated to a temperature of 142° C. and stretched 4.6-fold in the machine direction with a machine-direction stretching machine comprising rolls having different peripheral speeds.

A composition (A) was prepared by mixing 43 wt % polypropylene having an MFR of 8 g/10 min, 4 wt % maleic-acid-modified polypropylene, and 5% high-density polyethylene (MFR, 10 g/10 min) with 47.5 wt % calcium carbonate having an average particle diameter of 1.3 μm, and 0.5 wt % titanium white and was melt-kneaded in an extruder set at 240° C. A composition (B) was prepared by mixing 47 wt % polypropylene having an MFR of 11 g/10 min with 47.5 wt % calcium carbonate having an average particle diameter of 1.3 μm, 5% high-density polyethylene (MFR, 10 g/10 min), and 0.5 wt % titanium white and was melt-kneaded in another extruder set at 240° C. The two melts (i.e., compositions (A) and (B)) were superimposed in a multilayer coextrusion die, laminated on either side of the stretched sheet of composition (C), described above, in such a manner that the layer of composition (A) faced outward. Thus, a five-layer laminate having the structure A/B/C/B/A was obtained.

Stretching:

Using a tenter oven, the five-layer laminate described above was heated to 157° C. and then stretched 9.5-fold in the transverse direction. Subsequently, the laminate was passed through a heat-setting zone (set temperature, 163° C.) placed after the tenter oven to obtain a five-layer laminated film having a thickness of 84 μm (thicknesses of the individual layers: 5 μm/16 μm/42 μm/16 μm/5 μm).

Formation of Surface Treatment Layers:

Both sides of this film were subjected to corona discharge treatment at an applied-energy density of 90 W-min/m².

Subsequently, an aqueous solution containing a 1:1:1 mixture of a butyl-modified polyethyleneimine, an ethyleneimine adduct of a polyamine-polyamide, and an alkyl acrylate polymer having groups containing a quaternary ammonium salt structure was applied to each side of the film in an amount of about 0.1 g/m² (based on the weight of the dry film), and the coating was dried to form surface treatment layers on either side of the multilayer thermoplastic resin film.

Heat Treatment:

The film (i), obtained as described above, was heat-treated for 2 days in a forced-air oven set at 110° C.

Measurement of Degree of Dimensional Change:

The degree of dimensional change of the film (i), described above, was measured in the following manner. A "TMA120C" TMA apparatus, manufactured by Seiko Instruments Inc., was used in the tension mode. A fixed load of 5.25 g was used (tension per unit area, 15.625 g/mm²; the load was selected so as to be proportional to the film thickness, with the tension constant). A film sample was prepared so that the portion of the sample examined had a width of 4 mm and a length of 10 mm (the portions of the sample clamped to the upper and lower parts of the TMA were each 5 mm long). The rate of both heating and cooling during the measurement was 2° C./min. The temperature range over which the sample was measured was from 40° C. to a set temperature of 150° C. (actual temperature, 135° C.), and then the sample was cooled to room temperature. The degree of MD dimensional change (α) was 0.59%.

Property Measurement:

The basis weight of the thermoplastic resin film (i) of the present invention had a basis weight and a density, measured in accordance with JIS-P8118-1976, of 71 g/m² and 0.85 g/m³, respectively, and an opacity, measured in accordance with JIS-P8138-1976, of 91%. In addition, it had a porosity of 31%.

Formation of Toner-Receiving Layer:

A toner-receiving layer was formed on one side of the film (i) using about 10 g/m² of a coating prepared as described below.

To 100 g of water were successively added 40 parts of Brilliant S-15 (trade name; precipitated calcium carbonate pigment; 50 wt % aqueous dispersion; manufactured by Shiraishi Kogyo Kaisha, Ltd.), 10 parts of a 50 wt % aqueous dispersion of Ultra White 90 (trade name; clay pigment; manufactured by Engelhard, Ltd.), 45 parts of Mobinyl M735 (trade name; acrylic emulsion; solid content on dry basis, 43 wt %; manufactured by Hoechst Gosei K.K.), and 5 parts of a 15 wt % aqueous solution of Z-100 (trade name; modified poly(vinyl alcohol); manufactured by The Nippon Synthetic Chemical Industry Co, Ltd.) and stirred at room temperature for 2 hours to prepare a coating fluid.

This coating fluid was applied to one side of the film (i) with a bar coater in an amount of about 10 g/m² on a dry basis. The coated film was dried for 2 minutes in a 105° C. forced-air oven, removed, and then allowed to stand at room temperature for 4 hours. A pressure-sensitive adhesive and a release paper were subsequently applied to this coated film.

Formation of Pressure-Sensitive Adhesive Layer and Application of Release Paper:

6 g/m² (dry basis) of a solvent-based acrylic pressure-sensitive adhesive was applied to a silicone treated clay-coated paper release paper (iii) using a comma coater. Hereinafter, this release paper will be referred to as "release paper 1". The coating was dried to form a pressure-sensitive adhesive layer (ii). This release paper was applied to the thermoplastic resin film (i), having the toner-receiving layer described above, to obtain a label paper. The pressure-sensitive adhesive layer (ii) was disposed between the release paper (iii) and the surface of the thermoplastic resin film (i) which was not coated with the toner-receiving layer.

The degree of MD dimensional change (β) of the release paper used was measured under the same conditions as for the thermoplastic resin film (i), and was 0.18% (shrinkage).

Evaluation

The label, prepared as described above, was cut into A-4 (210 mm in width direction by 297 mm in flow direction). The cut label was allowed to stand in a thermo-hygrostatic chamber at temperature of 23° C. and a relative humidity of 50% for 1 day and then printed on a commercial heated-roll fixing type electrophotographic printer (Laser Shot 404G2; trade name; manufactured by Canon Inc.). The printing side of the label paper faced downward.

After being printed, the label was allowed to stand at room temperature on a flat table and the average of the curl heights at the four corners was determined 2 minutes after printing. The average of the curl heights was 34 mm.

Test printing of these labels was also carried out, and the print quality was visually evaluated. If the print quality of the labels was equivalent to the print quality obtained on a commercial PPC paper made mainly of a bleached chemical pulp, the print quality was considered satisfactory (O). If the printing had noticeable defects such as line width increase or deformation of printed characters, scumming, and insufficient printing density, the print quality was considered poor (X). The print quality of the label prepared as described above in Example 1 was considered satisfactory. The results of the evaluation of the label of Example 1 are shown in Table 1.

Comparative Example 1

Labels were prepared according to the procedure of Example 1, except that the heat treatment of the thermoplastic resin film (i) in a forced-air oven was omitted. The label was evaluated as described in Example 1, and the results are shown in Table 1

Example 2

A five-layer laminated thermoplastic resin film (i) having a thickness of 118 μm (thicknesses of the individual layers: 5 μm/25 μm/58 μm/25 μm/5 μm) was prepared using the procedure of Example 1, except that the thickness of some of the individual film layers is slightly different. The thermoplastic resin film obtained was treated for 2 days in a forced-air oven set at 110° C.

The same surface treatment and the same pressure-sensitive adhesive and release paper as in Example 1 were applied to produce a label paper which was evaluated as described in Example 1. The results are shown in Table 1.

Example 3

A composition (C') was prepared by compounding polypropylene having a melt flow rate (MFR) of 4 g/10 min with 15 wt % heavy calcium carbonate having an average particle diameter of 1.3 μm, 0.7 wt % titanium white, and 5.5 wt % high-density polyethylene having an MFR of 11 g/10 min was kneaded in an extruder set at 250° C., subsequently extruded in a sheet form using a T-die connected to an extruder set at 230° C., and cooled with a cooler to obtain an unstretched sheet.

This unstretched sheet was heated to a temperature of 148° C. and stretched 4.6-fold in the machine direction with a machine-direction stretching machine comprising rolls having different peripheral speeds.

A composition (A') was prepared by mixing 45 wt % polypropylene having an MFR of 10 g/10 min, 5 wt % maleic-acid-modified polypropylene, and 5% high-density polyethylene (MFR, 10 g/10 min) with 44.5 wt % calcium carbonate having an average particle diameter of 1.3 μm and 0.5 wt % titanium white and melt-kneading the mixture in an extruder set at 250° C. A composition (B') was prepared by mixing 47 wt % polypropylene having an MFR of 11 g/10 min with 47.5 wt % calcium carbonate having an average particle diameter of 1.3 μm, 5% high-density polyethylene (MFR, 10 g/10 min), and 0.5 wt % titanium white and melt-kneaded the mixture in another extruder set at 240° C. The two melts (i.e., compositions (A') and (B')) were superimposed in a multi-layer coextrusion die, laminated on either side of the stretched sheet of composition (C'), described above, in such a manner that the layer of composition (A') faced outward. Thus, a five-layer laminate having the structure A'/B'/C'/B'/A' was obtained.

Stretching:

The five-layer laminate described above was heated to 158° C. in a tenter oven, and then stretched 9.5-fold in the transverse direction. Subsequently, the laminate was passed through a heat-setting zone (set temperature, 175° C.) located after the tenter oven to obtain a five-layer laminated film having a thickness of 84 μm (thicknesses of the individual layers: 5 μm/17 μm/40 μm/17 μm/5 μm.

The same procedure was carried out as in Example 1, except that the treatment of the film in a forced-air oven was omitted.

Thus, a pressure-sensitive adhesive and a release paper were applied to produce a label paper. This label paper was evaluated, and the results are shown in Table 1.

Example 4

A composition (D') was prepared by compounding polypropylene having a melt flow rate (MFR) of 4 g/10 min with 15 wt % heavy calcium carbonate having an average particle diameter of 1.3 μm, 5 wt % high-density polyethylene having an MFR of 10 g/10 min, and 0.7 wt % titanium white, then kneaded the composition in an extruder set at 250° C., extruding the composition into strands, then pelletizing the strands.

A three-layer T-die was connected to two extruders. The extruder used to provide the polymer melt for the central layer of the T-die was set at 240° C., and the extruder used to provide polymer melt for the outside layers of the T-die was set at 250° C. The composition (D') was extruded from the extruder supplying the central layer of the T-die, and a composition (E') containing a polypropylene having an MFR of 4 g/10 min, 10 wt % calcium carbonate with an average particle diameter of 1.3 μm and 0.7 wt % titanium white was extruded from the extruder supplying the exterior layers of the T-die, thereby providing an extruded sheet having a three-layer structure, E'/D'/E'. This extruded sheet was cooled with a cooler to provide an unstretched three-layer laminated sheet.

This unstretched sheet was heated to a temperature of 142° C. and stretched 4.8-fold in the machine direction with a machine-direction stretching machine comprising rolls having different peripheral speeds.

This five-layer laminate was heated to 157° C. and then stretched 9.5-fold in the transverse direction using a tenter oven.

The stretched laminate was then passed through a heat-setting zone (set temperature, 170° C.) located after the tenter oven to provide a three-layer laminated film base (i) having a thickness of 78 μm (thicknesses of the individual layers: 8 μm/62 μm/8 μm).

The thermoplastic resin film then heat-treated for 3 days in a forced-air oven set at 110° C.

The thermoplastic resin film was then subjected to the same surface treatment, application of a pressure-sensitive adhesive and a release paper as described in Example 1, thereby providing a label paper. The label paper was evaluated, and the results are shown in Table 2.

Example 5

The production of a thermoplastic resin film (i), formation of a toner-receiving layer, formation of a pressure-sensitive adhesive layer, and application of a release paper were conducted by conducting the same procedure as in Example 1, except that the release paper used was a release paper (iii) having a thickness of 120 μm and a density of 1.1 g/m² obtained by treating a clay-coated paper with a silicone (hereinafter abbreviated as release paper 2). Thus, a label paper was obtained.

The degree of MD dimensional change (P) of the release paper used was measured under the same conditions as for the thermoplastic resin film (i). As a result, it was −0.1% (elongation).

The results of evaluation are shown in Table 1.

Comparative Example 2

The same procedure as in Comparative Example 1 was conducted, except that the same release paper as in Example 5 was used. Thus, a label paper to which a pressure-sensitive adhesive and the release paper had been applied was produced. This label paper was evaluated. The results are shown in Table 1.

As apparent from Table 1 above, same effect is obtained by either of the two means specified in the invention, i.e., the degree of dimensional change ($\alpha$) and the degree of thermal shrinkage.

Example 6

Thermoplastic Resin Film (i)

A composition (C') prepared by compounding 79.4 wt % propylene homopolymer having a melt flow rate (MFR) of 3.3 g/10 min with 15 wt % heavy calcium carbonate having an average particle diameter of 1.5 μm, 0.6 wt % titanium white, and 5 wt % high-density polyethylene having an MFR of 10 g/10 min was kneaded with an extruder set at 250° C., subsequently extruded into a sheet form through a T-die connected to an extruder set at 240° C., and cooled with a cooler to obtain an unstretched sheet.

Into the above-described composition to be extruded in sheet form and into the following compositions to be extruded and laminated and the compositions used in the following Examples were incorporated 0.05 parts of 3-methyl-2,6-di-t-butylphenol, 0.05 parts of Irganox 1010 (trade name; manufactured by Ciba-Geigy Corp.) as a phenolic stabilizer, and 0.05 parts of Weston 618 (trade name; manufactured by G.E. Plastics) as a phosphorus compound stabilizer per 100 parts of the sum of the propylene homopolymer and calcium carbonate used.

This sheet was heated to a temperature of 142° C. and stretched 4.5-fold in the machine direction with a machine-direction stretching machine comprising rolls having different peripheral speeds.

A composition (A') prepared by mixing 46 wt % propylene homopolymer having an MFR of 8 g/10 min, 4 wt % maleic-acid-modified polypropylene, and 5% high-density polyethylene (MFR: 10 g/10 min) with 44.4 wt % calcium carbonate having an average particle diameter of 1.5 μm and 0.6 wt % titanium white was melt-kneaded with an extruder set at 240° C. A composition (B') prepared by mixing 49.4 wt % propylene homopolymer having an MFR of 10 g/10 min with 45 wt

TABLE 1

| | Example 1 | Comparative Example 1 | Example 2 | Example 3 | Example 4 | Example 5 | Comparative Example 2 |
|---|---|---|---|---|---|---|---|
| Thermoplastic resin film base (i) | | | | | | | |
| Thickness (μm) | 84 | 84 | 118 | 84 | 78 | 84 | 84 |
| Basis weight (g/m²) | 71 | 64 | 99 | 83 | 59 | 71 | 64 |
| Density (g/cm³) | 0.85 | 0.76 | 0.84 | 0.99 | 0.76 | 0.85 | 0.76 |
| Porosity (%) | 31 | 33 | 32 | 12 | 30 | 31 | 33 |
| Opacity (%) | 91 | 91 | 92 | 72 | 74 | 91 | 91 |
| Degree of dimensional change $\alpha$ by thermomechanical analysis (%) | 0.6 | 3.1 | 0.57 | −0.3 | 0.55 | 0.6 | 3.1 |
| Degree of thermal shrinkage (%), 130EC, 30 min | 0.82 | 2.1 | 0.8 | 0.7 | 0.75 | 0.82 | 2.1 |
| Kind of release paper used | release paper 1 | release paper 1 | release paper 1 | release paper 1 | release paper 1 | release paper 1 | release paper 1 |
| Degree of dimensional change $\beta$ of release paper by thermomechanical analysis (%) | 0.18 | 0.18 | 0.18 | 0.18 | 0.18 | −0.1 | −0.1 |
| Difference in degree of dimensional change by thermomechanical analysis between base (i) and release paper, $\alpha$–$\beta$ (%) Results of print evaluation | 0.42 | 2.92 | 0.39 | −0.48 | 0.37 | 0.7 | 3.2 |
| Curl height (mm), 2 min after printing | 35 | Cylinder | 33 | 33 | 32 | 38 | cylinder |
| Print quality | ○ | ○ | ○ | ○ | ○ | ○ | ○ |

% calcium carbonate having an average particle diameter of 1.5 μm, 5% high-density polyethylene (MFR: 10 g/10 min), and 0.6 wt % titanium white was melt-kneaded with another extruder set at 240° C. The two melts were superposed within a die: and laminated by coextrusion to each side of the stretched sheet obtained by extruding the resin composition (C') described above and stretching the extrudate 4.5 times in the machine direction, in such a manner that (A') faced outward. Thus, a five-layer laminate (A'/B'/C'/B'/A') was obtained.

(Stretching)

Using a tenter oven, the five-layer laminate described above was heated to 157° C. and then stretched 9.4-fold in the transverse direction. Subsequently, the laminate was passed through a heat-setting zone (set temperature, 168° C.) located after the tenter oven to obtain a five-layer laminated film having a thickness of 80 μm (thicknesses of the individual layers: 5 μm/15 μm/40 μm/15 μm/5 μm).

(Formation of Surface Treatment Layers)

Both sides of this film were subjected to corona discharge treatment at an applied-energy density of 90 W·min/m².

Subsequently, an aqueous solution containing a 1:1:1 mixture of a butyl-modified polyethyleneimine, an ethyleneimine adduct of a polyamine-polyamide, and an alkyl acrylate polymer having groups containing a quaternary ammonium salt structure and represented by the following structural formula, in the molecular chain was applied to each side of the film in an amount of about 0.1 g/m² on a dry basis, and the coating was dried to form surface treatment layers.

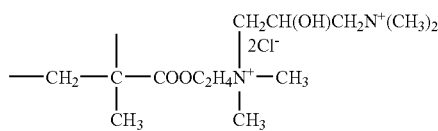

(Heat Treatment)

This film (i) was cut into a B-4 size and heat-treated for 1 hour in a forced-air oven set at 110° C.

(Property Measurement)

This film (i) was cut into a square shape of 100 mm in each of length and width, and the dimensions thereof were measured with a cathetometer in a thereto-hygrostatic chamber having a temperature of 23° C. and a relative humidity of 50%. Thereafter, the cut film was heat-treated in a 130° C. forced-air oven for 30 minutes, taken out therefrom, and then allowed to cool in the same thereto-hygroscopic chamber for 1 hour. The dimensions thereof were measured. The degree of shrinkage was calculated by comparison with the dimensions measured before the oven heat treatment. As a result, the degree of machine-direction shrinkage was 1.0%, that of transverse-direction shrinkage was 0.6%, and the average was 0.8%. The film had a basis weight and a density as measured in accordance with JIS-P8118-1976 of 68.4 g/m² and 0.85 g/cm³, respectively. It further had a porosity of 31%.

(Formation of Toner-Receiving Layer)

A toner-receiving layer was formed on one side of the film (i) by coating in an amount of about 10 g/m² by conducting the same procedure as in Example 1.

This film was used in the subsequent application of a pressure-sensitive adhesive and a release paper thereto.

(Application of Pressure-Sensitive Adhesive and Release Paper)

A solvent-based acrylic pressure-sensitive adhesive was applied to a release paper (iii) having a thickness of 115 μm and a density of 1.2 g/m² obtained by treating a clay-coated paper with a silicone (hereinafter abbreviated as coal type) on the silicone-treated side with a bar coater in an amount of 8 g/m² on a dry basis. The coating was dried to form a pressure-sensitive adhesive layer (ii). This release paper was applied to the plastic resin film (i) having the toner-receiving layer described above to obtain a label paper.

(Evaluation)

The label paper obtained was cut into A-4 (210 mm in width by 297 mm in flow). The cut label was allowed to stand in a thermo-hygrostatic chamber of 23° C. and a relative humidity of 50% for 1 day and then printed on a commercial heated-roll fixing type electrophotographic printer (Laser Shot 404G2; trade name; manufactured by Canon Inc.), in which paper passed with its printing side facing upward.

After having been printed on the printer, the label was allowed to stand at room temperature on a flat table and the average of the curl heights at the four corners was determined at 2 minutes after the printing. As a result, the average was found to be 39 mm.

Test printing was conducted in a test printing and the print quality was visually evaluated. The prints which were equal in print quality to a print obtained by printing a commercial PPC paper made mainly of a bleached chemical pulp are regarded as satisfactory (O), while those which had noticeable defects such as line width increase or deformation of printed characters, scumming, and printing density insufficiency are regarded as poor (X). Example 6 was on a satisfactory level. The results of the evaluation of Example 6 are shown in Table 2.

Comparative Example 3

The same procedure as in Example 6 was conducted, except that the heat treatment was omitted. Thus, a pressure-sensitive adhesive and a release paper were applied to produce a label paper, and this label paper was evaluated. The results are shown in Table 2.

Comparative Example 4

The same procedure as in Example 6 was conducted, except that synthetic paper Yupo FPG-80 (trade name; manufactured by Oji-Yuka Synthetic Paper Co., Ltd.) was used as a thermoplastic resin film. Thus, a pressure-sensitive adhesive and a release paper were applied to produce a label paper, and this label paper was evaluated. The results are shown in Table 2.

Example 7 to Example 9

The same procedure as in Example 6 was conducted, except that the heat treatment in the forced-air oven was conducted for time periods of 0.5 hours, 4 hours, and 168 hours. The results of evaluation are shown in Table 2.

Example 10

The same procedure as in Example 6 was conducted, except that the heat treatment in the forced-air oven was conducted at a temperature of 130° C. The results of evaluation are shown in Table 2.

Example 11

The same procedure as in Example 6 was conducted, except that the heat treatment in the forced-air oven was conducted at a temperature of 105° C. for a time period of 24 hours. The results of evaluation are shown in Table 2.

Example 12

A composition (C') prepared by compounding 79.4 wt % propylene homopolymer having a melt flow rate (MFR) of 3.3 g/10 min with 15 wt % heavy calcium carbonate having an average particle diameter of 1.5 μm, 0.6 wt % titanium white, and 5 wt % high-density polyethylene having an MFR of 10 g/10 min was kneaded with an extruder set at 250° C., subsequently extruded into a sheet form through a T-die connected to an extruder set at 240° C., and cooled with a cooler to obtain an unstretched sheet.

This sheet was heated to a temperature of 147° C. and stretched 4.4-fold in the machine direction with a machine-direction stretching machine comprising rolls having different peripheral speeds.

A composition (A') prepared by mixing 46 wt % propylene homopolymer having an MFR of 8 g/10 min, 4 wt % maleic-acid-modified polypropylene, and 5% high-density polyethylene (MFR: 10 g/10 mm) with 44.4 wt % calcium carbonate having an average particle diameter of 1.5 urn and 0.6 wt % titanium white was melt-kneaded with an extruder set at 240° C. A composition (B') prepared by mixing 49.4 wt % propylene homopolymer having an MFR of 10 g/10 min with 45 wt % calcium carbonate having an average particle diameter of 1.5 μm, 5% high-density polyethylene (MFR: 10 g/10 min), and 0.6 wt % titanium white was melt-kneaded with another extruder set at 240EC. The two melts were superposed within a die, and laminated by coextrusion to each side of the stretched sheet obtained by extruding the resin composition (C') described above and stretching the extrudate 4.5 times in the machine direction, in such a manner that (A') faced outward. Thus, a five-layer laminate (A'/B'/C'/B'/A') was obtained.

(Stretching)

Using a tenter oven the five-layer laminate described above was heated to 160° C. and then stretched 9-fold in the transverse direction. Subsequently, the laminate was passed through a heat-setting zone (set temperature, 168° C.) located after the tenter oven to obtain a five-layer laminated thermoplastic resin film (i) having a thickness of 132 μm (thicknesses of the individual layers: 6 μm/27 μm/66 μm/27 μm/6 μm). The thermoplastic resin film obtained was cut into a B-4 size and treated for 2 hours in a forced-air oven set at 110° C.

The same heat treatment and the same application of a pressure-sensitive adhesive and a release paper as in Example 6 were conducted to produce a label paper, which was evaluated. The results are shown in Table 3.

Comparative Example 5

The same procedure as in Example 13 was conducted, except that the heat treatment was omitted. Thus, a pressure-sensitive adhesive and a release paper were applied to produce a label paper, and this label paper was evaluated. The results are shown in Table 3.

Example 14

The same procedure as in Example 6 was conducted, except that a heat treatment was conducted in such a manner that the thermoplastic resin film was wound into a roll and the front and back sides of the film were successively brought into contact with four metal rolls set at 120° C. while regulating the contact time to about 4 minutes. The results of evaluation are shown in Table 3.

TABLE 2

|  | Example 6 | Comparative Example 3 | Comparative Example 4 | Example 7 | Example 8 | Example 9 | Example 10 | Example 11 |
|---|---|---|---|---|---|---|---|---|
| Thermoplastic resin film base (i) | | | | | | | | |
| Thickness (μm) | 80 | 80 | 80 | 80 | 80 | 80 | 80 | 80 |
| Basis weight (g/m²) | 68.4 | 68.4 | 61.6 | 68.4 | 68.4 | 68.5 | 68.5 | 68.5 |
| Density (g/m³) | 0.85 | 0.85 | 0.77 | 0.85 | 0.85 | 0.85 | 0.85 | 0.85 |
| Porosity (%) | 31 | 31 | 33 | 31 | 31 | 31 | 31 | 31 |
| Opacity (%) | 90 | 90 | 90 | 90 | 90 | 90 | 90 | 90 |
| Conditions of heat treatment | | | | | | | | |
| Temperature (EC) | 110 | none | none | 110 | 110 | 110 | 130 | 105 |
| Time (hr) | 1 | none | none | 0.5 | 4 | 168 | 1 | 24 |
| Degree of thermal shrinkage of (i) (%), 130EC, 30 min | 0.8 | 2.2 | 2.3 | 0.82 | 0.8 | 0.79 | 0.78 | 0.82 |
| Thickness after toner-receiving layer formation (μm) | 88 | 88 | 88 | 88 | 88 | 88 | 88 | 88 |
| Opacity after toner-receiving layer formation (%) | 92 | 92 | 92 | 92 | 92 | 92 | 92 | 92 |
| Kind of release paper used | coat type | coat type | coat type | coat type | coat type | coat type | coat type | coat layer |
| Results of print evaluation | | | | | | | | |
| Curl height (mm), 2 min after printing | 39 | cylinder | cylinder | 42 | 40 | 38 | 37 | 42 |
| Print quality (visual examination) | ◯ | ◯ | ◯ | ◯ | ◯ | ◯ | ◯ | ◯ |

TABLE 3

|  | Example 12 | Example 13 | Comparative Example 5 | Example 14 |
|---|---|---|---|---|
| Thermoplastic resin film base (i) | | | | |
| Thickness (μm) | 132 | 80 | 80 | 80 |
| Basic weight (g/m²) | 133 | 64 | 64 | 68.4 |
| Density (g/cm³) | 1.01 | 0.8 | 0.8 | 0.85 |
| Porosity (%) | 12 | 19 | 19 | 31 |
| Opacity (%) | 84 | 82 | 82 | 90 |
| Conditions of heat treatments | | | | |
| Temperature (EC) | 110 | 110 | none | 120 |
| Time (hr) | 2 | 2 | none | about 4 min |
| Degree of thermal shrinkage of (i) (%), 130EC, 30 min | 0.5 | 0.69 | 2.1 | 0.82 |
| Thickness after toner-receiving layer formation (μm) | 138 | 88 | 88 | 88 |
| Opacity after toner-receiving layer formation (%) | 90 | 89 | 89 | 92 |
| Kind of release paper used | coat type | coat type | coat type | coat type |
| Results of print evaluation | | | | |
| Curl height (mm), 2 min after printing | 33 | 35 | 68 | 41 |
| Print quality (visual examination) | ○ | ○ | ○ | ○ |

INDUSTRIAL APPLICABILITY OF THE INVENTION

As described above, according to the invention, a thermoplastic resin film, in particular, a polypropylene-based film, could be obtained which had suitability for heated-roll fixing type electrophotographic printers and was especially satisfactory in curling after printing.

Furthermore, a label paper employing the same could be obtained.

Since the thermoplastic resin film obtained according to the invention and the label paper employing the same are superior to plain-paper labels in strength and water resistance, they are useful as stickers for outdoor advertisement, labels for frozen-food containers, or namers (labels showing usage or notice) for industrial products.

The invention claimed is:

1. A label paper which comprises a thermoplastic resin film (i), a pressure-sensitive adhesive layer (ii), and a release layer (iii), in this order on the thermoplastic resin film (i), wherein the thermoplastic resin film (i) comprises a stretched thermoplastic resin sheet comprising a thermoplastic resin, wherein said thermoplastic resin film has a degree of dimensional change after heating and cooling (α) in the range of from −2% to 2% as measured by thermomechanical analysis in the range of from room temperature to 135° C. or which has a degree of thermal shrinkage of 1.8% or lower upon heating at 130° C. for 30 minutes or longer, wherein the thermoplastic resin is a polypropylene-based resin having a melting point of 155 to 167° C.

2. The label paper according to claim 1, wherein the thermoplastic resin film (i) has a degree of dimensional change after heating and cooling (α) in the range of from −2% to 2% as measured by thermomechanical analysis in the range of from room temperature to 135° C.

3. The label paper according to claim 1, wherein the thermoplastic resin film (i) has a degree of thermal shrinkage of 1.8% or lower upon heating at 130° C. for 30 minutes or longer.

4. The label paper according to claim 1, wherein the thermoplastic resin film (i) has a degree of dimensional change after heating and cooling (α) in the range of from −2% to 2% as measured by thermomechanical analysis in the range of from room temperature to 135° C., and having a degree of thermal shrinkage of 1.8% or lower upon heating at 130° C. for 30 minutes or longer.

5. The label paper according to claim 1, wherein the thermoplastic resin film (i) comprises from 35 to 100 wt % of a thermoplastic resin and from 65 to 0 wt % of inorganic and/or organic fine particles.

6. The label paper according to claim 1, wherein the thermoplastic resin film (i) has a porosity as shown by the following equation of from 8 to 60%:

$$\text{Porosity}(\%) = \frac{\rho_0 - \rho}{\rho_0} \times 100$$

wherein:
$\rho_0$: density of the thermoplastic resin film before stretching
$\rho$: density of the thermoplastic resin film after stretching.

7. The label paper according to claim 1, wherein the thermoplastic resin film (i) is prepared by a process comprising:
preparing a thermoplastic resin sheet comprising a thermoplastic resin;
stretching the thermoplastic resin sheet at a temperature 2 to 150° C. below the melting point of the thermoplastic resin; and
heating treating the stretched thermoplastic resin sheet;
wherein the thermoplastic resin film (i) has a degree of dimensional change after heating and cooling in the range of from −2% to 2% as measured by thermomechanical analysis in the range of from room temperature to 135° C., or which has a degree of thermal shrinkage of 1.8% or lower upon heating at 130° C. for 30 minutes or longer.

8. The label paper according to claim 7, wherein the heat treatment is carried out at 90° C. to 250° C.

9. The label paper according to claim 7, wherein the heat treating is carried out in an oven.

10. The label paper according to claim 1, further comprising a toner receiving layer on one side of the thermoplastic resin film (i).

11. The label paper according to claim 1, which comprises a toner receiving layer on at least a side of the thermoplastic resin film (i) opposite to a side of the thermoplastic resin film (i) in contact with a pressure-sensitive adhesive layer.

12. The label paper according to claim 1, wherein an A-4 size (210 mm×297 mm) sheet of the label paper has an average curl height at the four corners of 50 mm or smaller, measured 2 minutes after printing the label paper with a heated-roll fixing type electrophotographic printer.

13. The label paper according to claim 1, wherein the thermoplastic resin film (i) has a degree of dimensional change after heating and cooling ($\alpha$) in the range of from −2% to 2% as measured by thermomechanical analysis in the range of from room temperature to 135° C., and the difference ($\alpha$-$\beta$) between the degree of dimensional change ($\alpha$) of the film and the degree of dimensional change after heating and cooling ($\beta$) of the release paper (iii), as measured by thermomechanical analysis in the range of from room temperature to 135° C., is in the range of from −1.5% to 1.5%.

14. The label paper according to claim 7, further comprising depositing a toner receiving layer on one side of the thermoplastic resin film (i).

15. The label paper according to claim 14, further comprising depositing a toner receiving layer on a side of the thermoplastic resin film (i) and a pressure-sensitive adhesive layer on an opposite side of the thermoplastic resin film (i).

16. The label paper according to claim 7, wherein the thermoplastic resin film has an opacity as measured in accordance with JIS-P8138-1976 of from 20% to 100%.

17. The label paper according to claim 7, wherein an A4 (210 mm×297 mm) sheet of the label paper has an average curl height at the four corners of 50 mm or smaller, measured 2 minutes after printing the label paper with a heated-roll fixing types electrophotographic printer.

18. The label paper according to claim 17, wherein the thermoplastic resin film (i) has a degree of dimensional change after heating and cooling ($\alpha$) in the range of from −2% to 2% as measured by thermomechanical analysis in the range of from room temperature to 135° C., and the difference ($\alpha$-$\beta$) between the degree of dimensional change ($\alpha$) of the film and the degree of dimensional change after heating and cooling ($\beta$) of the release paper (iii), as measured by thermomechanical analysis in the range of from room temperature to 135° C., is in the range of from −1.5% to 1.5%.

19. The label paper according to claim 6, wherein the thermoplastic resin film (i) has an opacity as measured in accordance with JIS-P8138-1976 of from 20% to 100%.

20. The label paper according to claim 5, wherein the thermoplastic resin film (i) has a porosity as shown by the following equation of from 8 to 60%:

$$\text{Porosity}(\%) = \frac{\rho_0 - \rho}{\rho_0} \times 100$$

wherein:
$\rho_0$: density of the thermoplastic resin film before stretching
$\rho$: density of the thermoplastic resin film after stretching.

* * * * *